(No Model.)
J. B. FLECK.
Meat Tenderer.
No. 231,301. Patented Aug. 17, 1880.
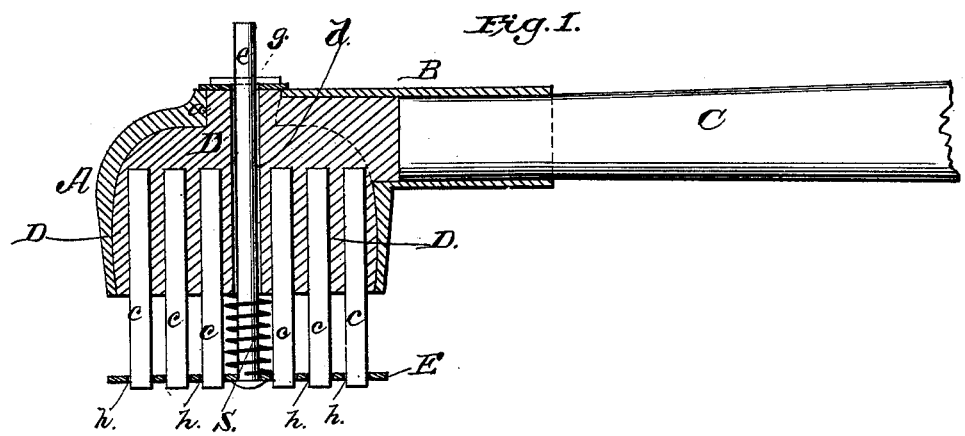
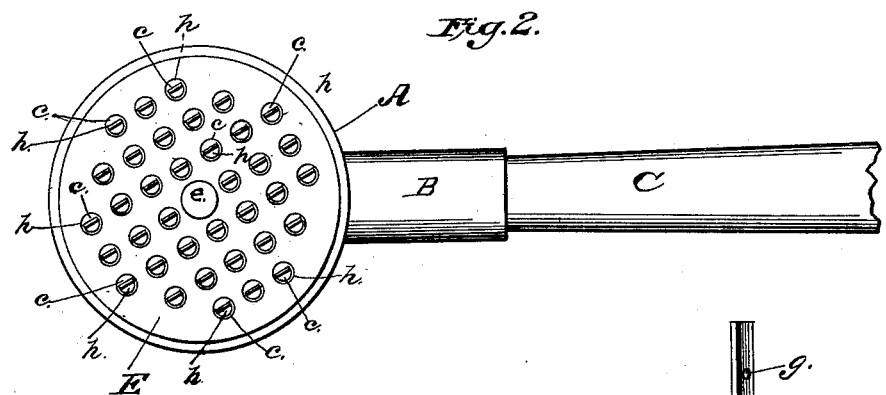
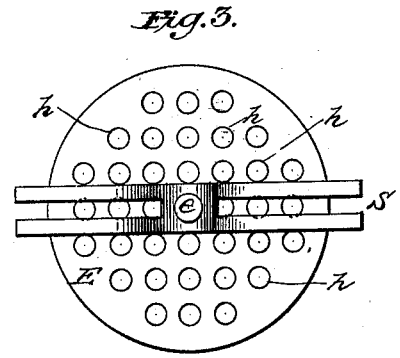
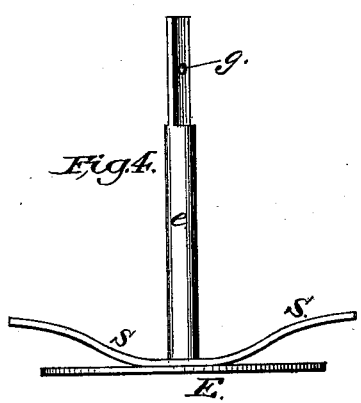
WITNESSES
John A. Ellis.
Frank J. Masi.
INVENTOR
John B. Fleck
by E. W. Anderson
his ATTORNEY.

UNITED STATES PATENT OFFICE.

JOHN B. FLECK, OF ITHACA, NEW YORK.

MEAT-TENDERER.

SPECIFICATION forming part of Letters Patent No. 231,301, dated August 17, 1880.

Application filed May 26, 1880. (No model.)

*To all whom it may concern:*

Be it known that I, JOHN B. FLECK, of Ithaca, in the county of Tompkins and State of New York, have invented a new and valuable Improvement in Meat-Tenderers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical central section of my improved masticator. Fig. 2 is a bottom view of the same, and Figs. 3 and 4 are detail modifications.

This invention has relation to improvements in steak tenderers or masticators; and it consists in the construction and novel arrangement of a meat-tenderer composed of a cast shell having its interior slightly expanded above the lower opening, a soft-metal filling, and half-round teeth held in said filling, which is held in said shell, as hereinafter shown and described.

The object of this invention is to provide an implement for masticating steak, which will have great solidity and weight immediately at the root of the teeth, and which at the same time will not be cumbrous, but a neat and easily-handled implement.

In the annexed drawings, the letter A designates the cast-iron shell, open at the base, and having through its top an aperture, $a$. Projecting out horizontally from the upper part of this shell is a socket, B, to receive a handle, C, of suitable length.

D indicates the soft-metal body or filling, which is run into the shell and holds the half-round teeth $c$, which are put in position in the shell before the filling is run in. In this manner the teeth are firmly secured, and being of the form stated, they cannot turn in their bed and become loose. Their lower ends are double-beveled or wedge-shaped, to enable them to enter the meat readily. Through the center of the body a large perforation, $d$, is made for the passage of the vertical stem $e$ of the cleaner-plate E, which is perforated with small holes $h$, corresponding to the teeth, and through which said teeth pass, the length of the stem being sufficient to allow the cleaner-plate to reach the ends of the teeth, and at the same time to allow its upper end to project above the shell to receive a pin-fastening through a transverse perforation, $g$. This pin is usually split, so that its ends can be spread to hold it in position.

A spring, S, is arranged between the cleaner-plate and body, to press the plate toward the ends of the teeth as they are drawn out of the meat by lifting the masticator.

The cavity of the shell is usually made larger above its base-opening than at its base, in order to hold the filling securely.

What I claim as new, and desire to secure by Letters Patent, is—

In a meat-tenderer, the cast shell A, having its interior slightly expanded above the lower opening, the soft-metal filling D, and the half-round teeth $c$, held in said filling, which is held in said shell, substantially as specified.

In testimony that I claim the above I have hereunto subscribed my name in the presence of two witnesses.

JOHN B. FLECK.

Witnesses:
SIMEON SMITH,
JOHN WOODWARD.